Jan. 26, 1965
D. W. BASTIAN
3,167,713
ELECTRONIC AUTOMATIC CONTROL CIRCUITRY FOR SATELLITE COMMAND RECEIVER
Filed June 22, 1961
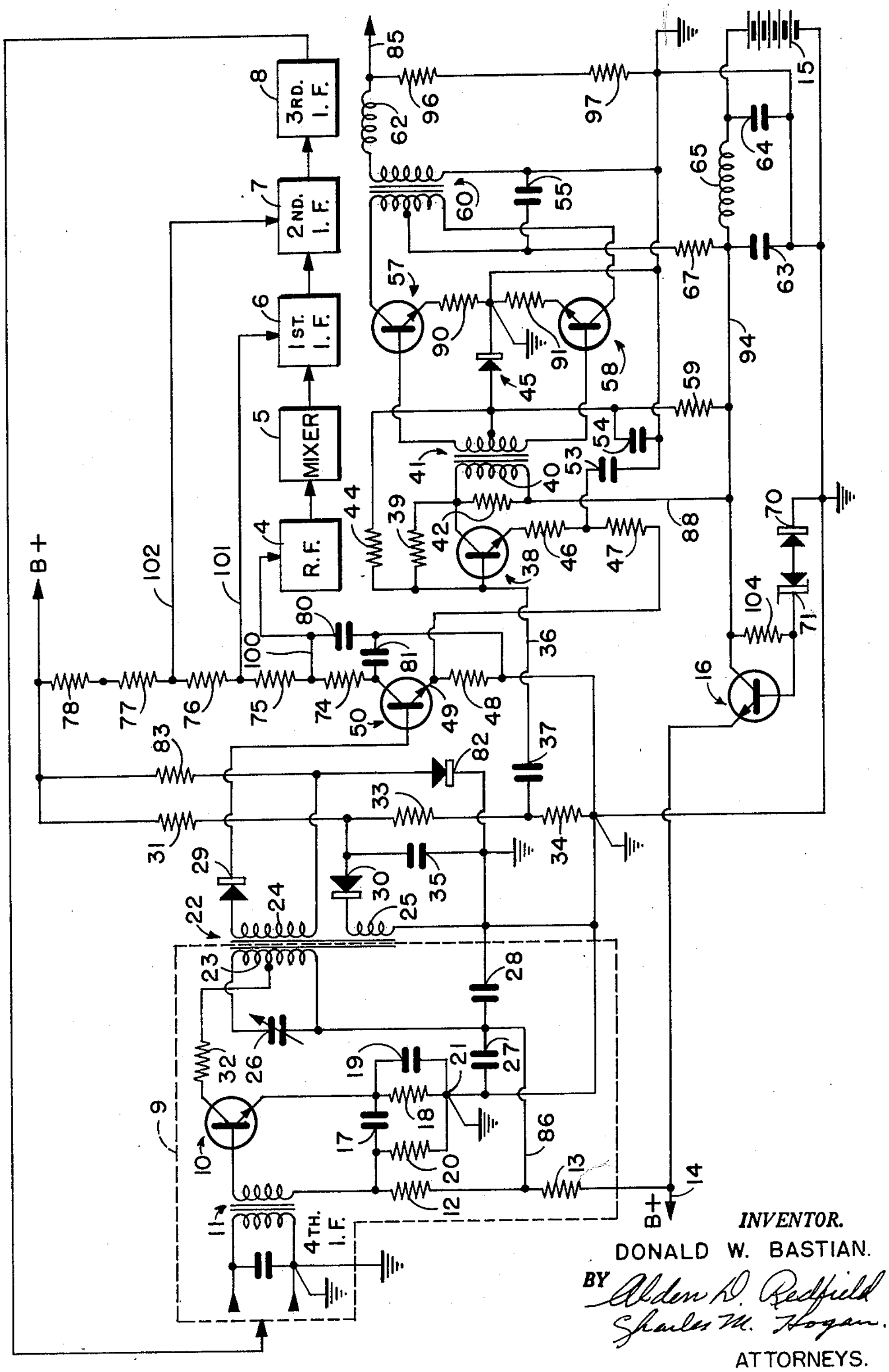
INVENTOR.
DONALD W. BASTIAN.
BY Alden D. Redfield
Charles M. Hogan.
ATTORNEYS.

United States Patent Office 3,167,713

Patented Jan. 26, 1965

3,167,713

ELECTRONIC AUTOMATIC CONTROL CIRCUITRY FOR SATELLITE COMMAND RECEIVER

Donald W. Bastian, Cincinnati, Ohio, assignor to Avco Corporation, Cincinnati, Ohio, a corporation of Delaware Filed June 22, 1961, Ser. No. 118,791
3 Claims. (Cl. 325—319)

The present invention relates to command receivers, specifically to radio receivers of the amplitude-modulated, very-high-frequency type which are used to respond to commands from a ground station to control the performance of various functions in objects moving in space, such as a rocket missile or an artificial satellite. It will be understood to those familiar with the art that command receivers constitute a part of the equipment carried by the missile or artificial satellite.

A principal object of the present invention is to provide an automatic gain control system for command receivers which accomplishes a surprising output stability, the unusual result being required by an extremely rigorous specification. For example, one gain control circuit in accordance with the present invention maintains an output of plus or minus 1 decibel over an input signal intensity range from 5 microvolts to 100,000 microvolts. The same specific embodiment of circuit in accordance with the invention holds the output within 2 decibels over a range of input signal intensity from 1 microvolt to 150,000 microvolts. This remarkable performance is maintained within a temperature range from −45° C. to 80° C. Thus it will be seen that the rigorous environmental conditions and constancy of output characteristic of command receivers place them in a category apart from ordinary communications receivers and navigational aids.

To illustrate further the rigorous exactions of a command receiver incorporating the present invention, the stand-by current drain of the single battery included in the preferred embodiment herein shown is approximately 7 milliamperes. While the receiver is detecting amplitude-modulated input signals, the current drain from the battery is 15 milliamperes. The same battery may supply power for a decoder and/or a tape recorder and/or data transmitters.

For the reasons stated, an object of the invention is to provide an automatic gain control system which accomplishes constancy of output signal amplitude on the order mentioned above, through an unusual range of temperature and in the face of limitations imposed by extremely low drain from the power supply.

For a better understanding of the present invention, together with other and further objects, advantages, and capabilities thereof, reference is made to the following description of the appended drawing, in the single unnumbered figure of which there is illustrated in schematic form, partially in block diagram, a preferred embodiment of an amplitude-modulated receiver in accordance with the invention.

In accordance with the invention there is provided, in a command receiver of the type which receives amplitude-modulated high frequency waves and processes them into audio output signals and of the type including a radio frequency stage 4, an oscillator modulator stage 5, and at least first and second intermediate frequency stages 6 and 7, a novel gain control and detection device comprising, in combination: an output transformer 22 for the intermediate frequency system, said transformer comprising a single primary 23 and first and second secondaries 24 and 25; a source of energy 15 having positive and negative terminals, the latter being grounded; an automatic gain control amplifying transistor 50 arranged in the common emitter configuration and having a base, collector, and emitter; a diode 29 poled with its anode adjacent the high potential terminal of the first secondary and in circuit between said high potential terminal and the base of the automatic gain control amplifying transistor; the combination of a resistor 83 and a second diode 82 poled with its cathode adjacent a ground point of reference potential connected between the positive terminal of said source and ground, the low potential terminal of the first secondary being connected to the junction of the second diode and the resistor, whereby the first and second diodes 29 and 82 comprise an automatic gain control detector and control the bias on said base; a series string of first, second, third, and fourth collector resistors 74, 75, 76, 77–78 between the collector of said amplifier transistor and the positive terminal of said source, the connections between said resistors defining first, second, and third junctions; a connection 100 between the first junction and gain control means in the radio frequency stage; a connection 101 between the second junction and gain control means in the first intermediate frequency stage; a connection 102 between the third junction and gain control means in the second intermediate frequency stage; by-pass capacitor means 80 connected between the first junction and ground; signal detection means 30 connected to the second of said secondaries; a common emitter configuration-arranged audio driving transistor 38 having its base coupled to said signal detector; said audio driving transistor having a plurality of series-connected resistors 46, 47, and 48 between its emitter and ground, the resistor 48 connected to ground being connected also in series between the emitter of the automatic gain control amplifying transistor and ground so as to stabilize the voltage of that emitter.

This receiver comprises a radio frequency stage 4, an oscillator modulator stage 5, and first, second, third, and fourth intermediate frequency stages 6, 7, 8, and 9 arranged in cascade after the manner of superheterodyne radio receivers.

Parenthetically, it will be understood that the parameters herein mentioned are given by way of illustration and not of limitation, they having been found suitable in one successful embodiment of the invention, actually reduced to practice.

There is applied to transistors 10 (type NPN), via an intermediate frequency transformer 11, a sinusoidal intermediate frequency signal of 10 megacycles, on which is amplitude-modulated a sine wave of audio frequency. Transistor 10 is coupled, by means presently described, to an audio detector diode 30, which derives the modulation components of the intermediate frequency signal. The audio detector is coupled to an audio driver stage including transistor 38 (NPN), and that transistor stage is in turn coupled to a push-pull audio output stage comprising transistors 57 and 58 (both NPN). The push-pull output of the audio stage is converted to a single-ended output, so that the detected sine wave audio signals appear between output terminal 85 and ground. The output of the fourth intermediate frequency amplifier transistor 10 is also coupled to an automatic gain control detector circuit including diodes 29 and 82. Diode 29 is directly connected to an automatic gain control amplifier stage including a transistor 50 (NPN). The collector load of this amplifier transistor comprises a series of resistors 74, 75, 76, 77, and 78. The junction of resistors 74 and 75 is connected to an attenuating network in the radio frequency stage 4 to control the gain of that stage. The junction of resistors 75 and 76 is connected to an attenuating network in the first intermediate frequency amplifier stage 6 to control the gain of that stage. Similarly, the junction of resistors 76 and 77 is connected to an attenuating network in the second intermediate frequency amplifier stage 7 to control its gain. These two attenuating networks are bridge attenuators using back-biased diodes. The use of AGC to control a bridge attenuator, in an intermediate frequency stage, using back-biased diodes is shown and described in a paper entitled "A New Method of Automatic Gain Control for HF and VHF Transistor Amplifiers" by Chow and Lazar, at pages 40 and 41 of the Digest of Technical Papers of the 1959 Transistor and Solid State Circuits Conference, published at Philadelphia, Pennsylvania, in 1959 by H. G. Sparks of the Moore School of Electrical Engineering of the University of Pennsylvania. Such paper is referred to and herein incorporated by reference. The use of bridge-type attenuators greatly increases the signal-handling capabilities of an intermediate frequency amplifying stage.

Having described the audio detector channel and the automatic gain control producing channel, the audio output and the several gain controls in gross outline, the specific description of the several stages now proceeds.

The secondary of the output transformer 11 of the third intermediate frequency amplifier has one output terminal connected to the base of transistor 10, and another output terminal which is connected, via dropping resistors 12 and 13, to bus bar or conductor 14, on which is present a closely regulated voltage (+B, 13.5 volts). While the transformer 11 has been placed within the block 9, or the fourth intermediate frequency amplifier stage, for purposes of convenience in showing the input transistor 10, that transformer is in fact the output transformer of the third intermediate frequency stage and is really the output of unit 8, at least so far as the primary of the transformer is concerned. Transistor 10 is arranged in the common emitter configuration, an emitter resistor 18, A.C. by-passed by a shunt capacitor 19, being connected between the emitter and ground 21 to provide D.C. degeneration and temperature stability. (Parenthetically, the expressions "A.C." and "D.C." as herein employed will be understood to be abbreviations of the expressions "alternating current" and "direct current," respectively.)

The circuit from conductor 14 to ground is completed through dropping resistor 20, so that a suitable positive bias is applied to the base of transistor 10. The emitter-base circuit of transistor 10 is closed for alternating current by blocking capacitor 17. The load on the collector of transistor 10 comprises transformer 22, which has a primary 23 tuned by adjustable capacitor 26, and two untuned secondaries 24 and 25. The collector-emitter output circuit of transistor 10 is closed for A.C. by capacitor 27, connected between the low potential terminal of the primary of transformer 22 and ground. Capacitor 28 is a by-pass condenser. Resistor 32 is low-valued, in order to effect an A.C. mismatch between the output of transistor stage 10 and its load, so that oscillations are prevented. A reverse bias for the collector of transistor 10 is provided by conductor 86, one end of which is connected to the junction of dropping resistors 12 and 13, and the other end of which is in a D.C. series path with dropping resistor 32 and the collector of transistor 10.

Referring now to the audio detector channel, the detector network comprises diode 30, poled with its anode connected to resistor 31; secondary 25, connected to the cathode of the diode; and the detector load network. This network comprises a parallel combination of capacitor 35 and series resistors 33 and 34, connected between the anode of diode 30 and ground.

Resistor 31 is connected between the anode of diode 30 and supply bus bar 14, in order to provide a forward bias for detector 30 to improve its linearity.

Referring further to the audio channel, the audio detector load is coupled, via conductor 36 and series capacitor 37, to the base of a common emitter audio driver stage including transistor 38 (NPN). The collector of transistor 38 is reverse biased, and its base is forward biased, by circuitry comprising conductor 88, the primary 40 of audio transformer 41, resistors 39 and 44, and diode 45, these elements being in series, the cathode of diode 45 being connected to ground, and conductor 88 being in circuit with the positive terminal of battery 15. The junction of resistors 39 and 44 is connected to the base of transistor 38. Resistor 42 shunts primary 40 for damping purposes.

Particular attention is directed to the emitter load of the audio driver transistor 38, which load comprises serially arranged resistors 46, 47, and 48, between the emitter of transistor 38 and ground. It should be noted for the present that the resistor 48 portion of this emitter load is in series with the emitter of automatic gain control amplifier transistor 50.

Capacitors 53 and 54 are conventional audio by-pass condensers.

The audio driver stage is coupled through transformer 41 to a push-pull output stage comprising symmetrically arranged transistors 57 and 58, the terminals of the secondary of transformer 41 being connected to the bases of these two transistors, and the collectors of these transistors being connected to the terminals of the primary of output transformer 60. This stage has emitter load resistors 90 and 91. Reverse collector bias is provided by connecting the center tap on the primary of transformer 60 through dropping resistor 67 effectively to the positive terminal of battery 15. Capacitor 55 is a by-pass capacitor between this center tap and ground.

Diode 45 has its anode connected to the center tap on the secondary of transformer 41, so that it functions to temperature-compensate with regard to the base currents of both of the transistors of the push-pull output stage. Further, it establishes the base bias. Forward bias is placed on diode 45 by connecting its anode, through resistor 59, to conductor 94. This biasing network returns to ground through diode 45. The bias on diode 45 is so established that the push-pull output stage operates in class AB. While that stage could be operated in class B or class C, the principal objectives here are minimum distortion and low stand-by power. Resistor 59 is selected to provide a working compromise between those objectives.

The output of the push-pull stage is transformed from double-end to single-end by a network comprising transformer 60, series radio frequency choke 62, and a combination of shunt resistors 96 and 97. The sine wave audio output signals appear in the output circuit comprising terminal 85 and ground.

The output appearing at terminal 85 comprises any one of a plurality of audio tones. This output is effectively in circuit with a group of audio filters (not shown), one for each tone. Any one of these desired tones may be modulated on the carrier at the command station so that relays are actuated from terminal 85 to perform the required command functions in accordance with the transmitted modulation or command. The audio filters are high Q parallel-tuned circuits as described in the copending patent application of Lawrence A. Busby, Serial No. 92,054, filed in the United States Patent Office on February 27, 1961, entitled "Noise Immune Filter," and assigned to the same assignee as the present application and invention. The Busby application issued September 1, 1964, as Patent No. 3,147,386, and reference is made to that patent for a detailed description of a suitable audio filter. Each filter presents a high impedance only at the frequency to which it is tuned. At frequencies other than those to which the filters are tuned they present a low impedance, so that insufficient output is derived from the receiver to perform command functions. The present invention is not limited to use of filters of this kind, and they are discussed for purposes of illustration and not of limitation.

The series choke 65, shunt capacitors 63, 64 network placed between the positive terminal of battery 15 and ground constitutes an isolating filter.

The automatic gain control detector diode 29 is poled with its anode connected to the secondary 24 of transformer 22 and its cathode connected to the base of automatic gain control D.C. amplifier transistor 50. This transistor is type NPN, having its collector in series with the supply terminal 14 via a chain of resistors 74, 75, 76, 77, and 78. A tap point between resistors 74 and 75 is brought out to conductor 100, which controls the attenuation of the radio frequency stage. Similarly, a tap point between resistors 75 and 76 is connected to conductor 101 to provide control for the first intermediate frequency stage attenuator. Likewise, a tap point between resistors 76 and 77 is connected to conductor 102 to control the attenuation of the second intermediate frequency stage. The radio frequency stage and its novel attenuator and the first and second intermediate frequency stages and their respective per se prior-art attenuators are shown in detail in the copending patent application of James C. Midkiff entitled "Signal Selector and Automatic Gain Control for Satellite Command Receiver," Serial No. 119,000, filed in the United States Patent Office contemporaneously herewith on June 22, 1961, and assigned to the same assignee as the present application and invention. The Midkiff application issued October 22, 1963, as Patent No. 3,108,225, and reference is made to that patent for a description of such stages and attenuators.

Capacitor 80 is connected between conductor 100 and ground as a radio frequency filter, and capacitor 81 is connected between the collector of transistor 50 and ground as an audio filter. The necessity for the latter filter is created by the fact that detector 29 is of the infinite impedance type.

Returning further to a consideration of the automatic gain control detector, a terminal of secondary 24 of transformer 22 is connected to a point in series between diode 82 and resistor 83. Resistor 83 provides forward bias for diode 82, and the voltage at the base of transistor 50 is established jointly by diodes 82 and 29, the polarities being such that, the stronger the A.C. input signal, the more positive becomes the bias applied to the base of transistor 50.

Attention is again invited to the fact that transistor 38 is in the audio detector channel, while transistor 50 is in the automatic gain control channel. It will be observed also that the emitter resistor of automatic gain control amplifier transistor 50 constitutes a part of the series emitter resistance in circuit with the audo driver transistor 38. The flow of current from audio driver transistor 38 through resistor 48 tends to maintain constant the voltage at emitter 49. It substanially eliminates the effect that changes in collector-emitter current through transistor 50 would have on the voltage of emitter 49 and greatly enhances the sensitivity of amplifier 50 in producing its automatic gain control outputs. Such changes are due to changes in signal amplitude on the base of transistor 50, Referring now to the regulating elements, there is disposed between supply bar 14 and choke 65 the emitter-collector circuit of a series voltage regulator transistor 16. This transistor is conventionally arranged as a regulator in combination with Zener diode 70 and temperature-compensating diode 71.

The following parameters have been found suitable in one practical embodiment of the invention:

| | | Value |
|---|---|---|
| Resistors: | | |
| 12 | ohms | 27,000 |
| 13 | do | 220 |
| 20 | do | 5600 |
| 18 | do | 390 |
| 32 | do | 470 |
| 31 | do | 680,000 |
| 33 | do | 22,000 |
| 34 | do | 27,000 |
| 83 | megohms | 1 |

| | | |
|---|---|---|
| Resistors: | | |
| 74 | ohms | 3900 |
| 75 | do | 47,000 |
| 76 | do | 68,000 |
| 77 | do | 82,000 |
| 78 | do | 22,000 |
| 48 | do | 820 |
| 44 | do | 120,000 |
| 39 | do | 680,000 |
| 42 | do | 22,000 |
| 46 | do | 1000 |
| 47 | do | 1000 |
| 59 | do | 68,000 |
| 104 | do | 2700 |
| 90 | do | 22 |
| 91 | do | 22 |
| 67 | do | 15 |
| 96 | megohms | 1 |
| 97 | ohms | 100,000 |
| Capacitors: | | |
| 17 | microfarads | .01 |
| 19 | do | .01 |
| 26 | micromicrofarads, variable | 41 |
| 27 | microfarads | .01 |
| 63 | do | 6.81 |
| 64 | do | .01 |
| 35 | do | .001 |
| 81 | do | .47 |
| 80 | do | .01 |
| 37 | do | .01 |
| 53 | do | 1 |
| 54 | do | .47 |
| 55 | do | 6.8 |
| 28 | do | .005 |
| Diodes and transistors: | | Type |
| 10 | | N104B |
| 29 | | FD100 |
| 30 | | FD100 |
| 50 | | 2N1613 |
| 38 | | 2N336A |
| 57 | | 2N336A |
| 58 | | 2N336A |
| 45 | | 1N547 |
| 82 | | SG22 |
| 16 | | 2N657 |
| 70 | | SG22 |
| 71 | | SZ165 |

Two phases of operation of the detector and automatic gain control amplifier are now considered. The first is the actual detection process of the circuit. The second is the result produced as the intermediate frequency signal is varied from a low level to a high level.

Consider the first phase. The portion of the circuit involving active elements 10, 50, 29, and 82 constitutes the AGC drive control and detector portions of the novel circuitry.

The action of the detectors and the automatic gain control amplifier is now described. Consider a signal from the intermediate frequency amplifier impressed upon the base of transistor 10. This circuit, except for filtering in the emitter-collector branch, may be regarded as a relatively normal intermediate frequency amplifier. An amplified signal is developed across the tuned primary of transformer 22. This primary is inductively coupled to two aperiodic secondary circuits. One, 25, serves primarily to drive a demodulator system feeding the power amplifier. A divider system 31, 33, 34—in this case fixed, but which may be made variable—serves as a signal level limiter. Now, referring to the secondary winding 24, the voltage developed across this winding is fed to transistor 50 through diode 29 and diode 82. These diodes operate dynamically in the opposite sense D.C.-wise. A forward potential is applied to diode 82 to maintain a predetermined static resistance, on the order of 4000 ohms, as provided by the generated voltage control of the semiconductor characteristic. This varactor or voltage-controlled resistor 82 is an important control element in the constant impedance rectifier system.

Transistor 50 effectively forms another varactor, or amplyfying voltage control resistor, in series with the divider string comprising resistors 78, 77, 76, 75, 74, and 48. The stronger the A.C. drive, the more D.C.-elevated becomes the base 50, and, correspondingly, the lower becomes the collector-emitter resistance. Therefore this active element becomes an A.C. signal-controlled gate exhibiting a resistance porportional to the received signal drive level. The feed through resistor 83 and diode 82 effects a divider fixed-biasing the base of 50 through diode 29 in a static sense. The application of an A.C. potential derived from the radio frequency input results in D.C. current flow through diode 29 and the base-emitter junction of transistor 50, resistor 48, and diode 82. This flow tends to reverse-bias diode 82, so that its resistance increases sharply according to its normal voltage-current characteristic. This produces two effects:

(1) It elevates the D.C. bias on the base of transistor 50; and (2) It over-compensates for the drop in impedance across the transistor 50 base-emitter junction, and presents a high impedance detector-amplifier input circuit such that essentially a constant load is maintained on the winding 24 of transformer 22.

There are other minor effects which contribute to the efficiency of the rectification circuit. For example, diode 29, while providing an A.C. path, provides a D.C. potential which is proportional to the radio frequency signal level and is additive to the elevated base bias. Diode 29, in conjunction with transistor 50, performs the functions of efficient low signal detection and amplification similar to the process described in U.S. Patent 2,941,076 to Congdon et al., entitled "Compound Demodulator." The diode 82 performs also as a voltage amplifier in support of this action. Such characteristics are revealed in U.S. Patent 2,666,816 to Hunter. This assures proper AGC drive, varying from an extremely low-level received signal across a range of several orders of magnitude. This circuit process, in addition to giving the proper automatic gain control stability, tends to eliminate flutter often occurring at the threshold control level.

The variable divider resistance provided by transistor 50 is reflected through the series divider string onto the D.C. drives of the three AGC controlled stages.

The emitter current of transistor 38, the audio drive, is fed through an R-C filter network to the emitter of transistor 50, so that it is common with the emitter current of transistor 50 in resistor 48. This accomplishes a D.C. stabilization of these two active elements. Extremely strong drives on transistor 50 effect a relatively elevated D.C. voltage condition across resistor 48, and this is reflected back into driver 38 both as a degenerative control and emitter elevation. It also introduces increased A.C. degeneration. This reflex action effects a gain control on driver 38 proportional to the drive signal. That is, the series degeneration effected by the elevated emitter circuit reduces the gain, so that a fixed audio signal level input becomes permissible. Otherwise, it may be necessary to make the fixed potentiometer involving resistors 33 and 34 a variable unit to control the amplitude of the low frequency signal to the base of transistor 38, or to operate with the input to transistor 38 well below optimum.

Note the effect on the audio gain from high signal levels on a cycle-by-cycle basis. As the automatic gain control amplifier 50 is driven harder, the gain of the audio driver 38 is reduced, on a cyclic basis only. This helps to maintain the audio output relatively constant for variations in percentage modulation of the carrier. If the modulation was low, the automatic gain control amplifier would not be driven as hard, and therefore would introduce less degeneration in the common-emitter resistor. Power for these cyclic surges is supplied by capacitor 81.

The other aspect to consider is the action of the automatic gain control amplifier with respect to the average level of the intermediate frequency carrier. As the signal level increases, the average D.C. current through transistor 50 increases. If it were not for the additional current from 38 through the common emitter resistor 48, it would not be possible to have a sharp knee on the AGC curve, since an increase in current through transistor 50 would cause the voltage at the emitter to rise, which is a counteracting effect to an increase in signal level. Basically, if the additional current from transistor 38 were not present, a very slow-acting automatic gain control would result.

While there has been shown and described what is at present considered to be the preferred embodiment of the invention, it will be understood by those skilled in the art that various changes and modifications may be made therein without departing from the scope of the invention as defined in the appended claims.

I claim:

1. In a command receiver of the type which receives amplitude-modulated high frequency waves and processes them into audio output signals and of the type including a radio frequency stage, an oscillator modulator stage, and at least first and second intermediate frequency stages, a novel gain control and detection device comprising, in combination: an output transformer for the intermediate frequency system, said transformer comprising a single primary and first and second secondaries; a source of energy having positive and negative terminals, the latter being grounded; an automatic gain control amplifying transistor arranged in the common emitter configuration and having a base, collector, and emitter; a diode poled with its anode adjacent the high potential terminal of the first secondary and in circuit between said high potential terminal and the base of the automatic gain control amplifying transistor; the combination of a resistor and a second diode poled with its cathode adjacent a ground point of reference potential connected between the positive terminal of said source and ground, the low potential terminal of the first secondary being connected to the junction of the second diode and the resistor, whereby the first and second diodes comprise an automatic gain control detector and control the bias on said base; a series string of first, second, third, and fourth collector resistors between the collector of said amplifier transistor and the positive terminal of said source, the connections between said resistors defining first, second, and third junctions; a connection between the first junction and gain control means in the radio frequency stage; a connection between the second junction and gain control means in the first intermediate frequency stage; a connection between the third junction and gain control means in the second intermediate frequency stage; by-pass capacitor means connected between the first junction and ground; signal detecting means connected to the second of said secondaries; a common emitter configuration-arranged audio driving transistor having its base coupled to said signal detecting means; said audio driving transistor having a plurality of series-connected resistors between its emitter and ground, the resistor connected to ground being connected also in series between the emitter of the automatic gain control amplifying transistor and ground so as to stabilize the voltage of that emitter.

2. The combination in accordance with claim 1 in which the signal detecting means comprises a third diode poled with its cathode adjacent the high potential terminal of the second secondary; a resistance network between the positive terminal of said source and ground to provide bias for said third diode, the low potential terminal of said secondary being connected to ground; a by-pass capacitor between the anode of the third diode and ground; and a capacitance coupling means between a point on said resistance network and the base of said audio driver transistor.

3. In a radio receiver of the type including an amplitude modulation radio frequency stage, an oscillator modulator stage, and at least first and second intermediate frequency stages, said stages being coupled in cascade in the order named, a novel gain control system comprising, in combination: an output transformer for the intermediate frequency system, said transformer comprising two secondaries; automatic gain control detector means coupled to one of said secondaries; amplitude-modulated signal detector means coupled to the other of said secondaries; said automatic gain control detector means comprising diodes poled with their anodes individually connected to the terminals of said one secondary; automatic gain control amplifying means coupled to said automatic gain control detector, the automatic gain control amplifying means having a tapped-resistance output circuit; and individual connections from said tapped-resistance load to said radio frequency stage and said first and second intermediate frequency stages for controlling their gains.

References Cited by the Examiner

UNITED STATES PATENTS

| | | | |
|---|---|---|---|
| 2,472,301 | 6/49 | Koch | 325—404 |
| 2,835,795 | 5/58 | Kroger | 325—411 |
| 2,837,635 | 6/58 | Epperson | 325—399 |
| 2,892,931 | 6/59 | Koch | 325—488 XR |
| 2,950,356 | 8/60 | Stott. | |

DAVID G. REDINBAUGH, *Primary Examiner.*

ROY LAKE, *Examiner.*